United States Patent
Beerepoot et al.

(10) Patent No.: US 6,262,189 B1
(45) Date of Patent: *Jul. 17, 2001

(54) ADVANCED EPOXY RESIN FROM MIXING POLYEPOXIDE AND OH- OR COOH-COMPOUND AS FEEDSTREAM

(75) Inventors: Johannes Petrus Jozef Beerepoot, Amsterdam (NL); Johannes Jozias Blom, Amsterdam (NL); Feike De Jong, Amsterdam (NL); Wilhelmina Johanna Maria Van Der Linden-Lemmers, Amsterdam (NL); Willem Sjardijn, Amsterdam (NL); Virgilius Christiaan Johannes Nicolaas Van Liempd, Amsterdam (NL); Paulus Egidius Raas, The Hague (NL)

(73) Assignee: Shell Oil Company, Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/397,280

(22) Filed: Sep. 16, 1999

Related U.S. Application Data

(62) Division of application No. 09/118,265, filed on Jul. 17, 1998, now Pat. No. 6,022,931, which is a division of application No. 08/844,128, filed on Apr. 18, 1997, now Pat. No. 5,824,752.

(30) Foreign Application Priority Data

Apr. 19, 1996 (EP) .................................................. 96201053

(51) Int. Cl.$^7$ ............................. C08G 59/42; C08G 59/62
(52) U.S. Cl. .......................... 525/523; 525/480; 525/509; 528/89; 528/93; 528/102; 528/112
(58) Field of Search .................................. 525/480, 508, 525/523; 528/89, 93, 102, 112

(56) References Cited

U.S. PATENT DOCUMENTS

| | | | |
|---|---|---|---|
| 3,547,881 | 12/1970 | Mueller et al. | 260/47 |
| 3,694,407 | 9/1972 | Krikorian | 260/47 |
| 3,842,037 | 10/1974 | Sinnema | 260/47 |
| 3,919,169 | 11/1975 | Ramsey et al. | 260/47 |
| 4,105,634 | 8/1978 | Hanson et al. | 526/65 |
| 4,389,357 | 6/1983 | Chu et al. | 264/40.1 |
| 4,389,520 | 6/1983 | Gannon | 528/89 |
| 4,438,254 | 3/1984 | Doorakain et al. | 528/89 |
| 4,684,700 | 8/1987 | Wang et al. | 528/481 |
| 4,722,981 | 2/1988 | Koenig et al. | 528/481 |

Primary Examiner—Robert E. L. Sellers

(57) ABSTRACT

The invention provides for a process for the preparation of an advanced epoxy resin by reaction of a compound having on average more than one epoxy group per molecule and a compound having on average one or more hydroxyl group or carboxyl group per molecule in the presence of a catalyst at elevated temperature, the process comprising (1) mixing the epoxy compound, the hydroxyl compound or the carboxyl compound and the catalyst, and (2) transferring the mixture as a feedstream to a surface which is at least intermittently moving with respect to the feedstream. In a preferred embodiment an endless conveyer belt with additional heating means and optional cooling means are used.

9 Claims, No Drawings

ADVANCED EPOXY RESIN FROM MIXING POLYEPOXIDE AND OH- OR COOH-COMPOUND AS FEEDSTREAM

This is a divisional of application Ser. No. 09/118,265, filed Jul. 17, 1998, now U.S. Pat. No. 6,022,931, which is a division of application Ser. No. 08/844,128, filed Apr. 18, 1997, now U.S. Pat. No. 5,824,752.

FIELD OF THE INVENTION

The present invention relates to a process for the preparation of an advanced resin.

BACKGROUND OF THE INVENTION

Epoxy resins are well known in the art. In combination with a suitable curing agent, they result in thermosetting products showing superior toughness, chemical resistance, heat resistance, adhesion and electrical properties.

The most common types of epoxy resins are those which are based on bisphenol-A and which contain 1,2-epoxy groups. These compounds can be made by reaction of bisphenol-A with epichlorohydrin. The reaction is often carried out in such a way that liquid reaction products are obtained, but higher molecular weight semi-solid and solid products are also produced in this way. Another process to produce higher molecular weight semi-solid and solid resinous polyepoxides is a process known as "upgrading" or "advancement". In such an upgrading or advancement process, usually an initially liquid resinous polyepoxide is reacted with a dihydric phenol in the presence of a catalyst until the required amount of the dihydric phenol is incorporated in the epoxy chain to increase the molecular weight to the desired level.

It will be appreciated that said upgrading or advancement process as described hereinbefore with reference to dihydric phenol, can also be carried out using carboxyl compound or other hydroxyl compounds.

Such upgrading processes have been described in the past both on a batch basis and on a continuous basis, see e.g. U.S. Pat. Nos. 3,547,881, 3,919,169 and 4,105,634. In such known batch and continuous processes, the dihydric phenol and liquid epoxy resin are mixed together at a relatively low temperature and then heated up to the reaction temperature and held at elevated temperature for the time sufficient to produce the resinous epoxy compound of the higher molecular weight. The catalyst is usually added either to the starting reaction mixture at the relatively low temperature or after heating of the reacting mixture to the reaction temperature.

In such known batch and continuous upgrading processes, however, cycle times, including dumping, are typically relatively lengthy. For example, batch processes involving bisphenol-A and a liquid polyepoxide consisting essentially of the diglycidyl ether of bisphenol-A can take from 4 to 20 hours for the reaction to be completed. Further, the homogeneity of temperature in a large kettle reactor is complicated by heat transfer, i.e. the heat of reaction is more difficult to control and localized high heats will cause adverse reactions to occur, e.g. crosslinking and/or gelling. Furthermore, the reaction may continue during dumping when the conditions are less controlled, resulting in different conditions for different batches and thus in different product properties for each batch. The continuous process using a pipe reactor described in U.S. Pat. No. 3,919,169 involves a shorter reaction time in the order of about two hours, but in a continuous process it would be highly advantageous if the reaction time could be significantly lower. Also, due to the flow profile in a pipe, the use of pipe reactors often results in a rather broad molecular weight distribution and in a fouling of the reactor wall, ultimately resulting in a thick layer of deposited material which needs regular cleaning.

In addition to economies of time, long reaction times can lead to a relatively wide molecular weight distribution which may in their turn lead to end use disadvantages. For example, surface coating imperfections due to gel particles (MEK-insolubles, MEK is methyl ethyl ketone) have been observed when molecular weight distribution and concomitant viscosity characteristics are not properly controlled.

Another possibility to produce advanced epoxy resin is the use of an extruder process. However, there are numerous disadvantages to such a process. The investment costs are relatively high, the more because high performance extruders are needed (to avoid any stagnant zones). Further, a relatively high effort is needed to operate the extruder, maintenance is cumbersome and the product quality is not optimal, especially due to gel formation (gel particles which do not dissolve in MEK). These gel particles may result in a low quality cured product. Another disadvantage is the relatively short residence time in an extruder (typically up to five minutes). This short residence time results in the need to use relatively high catalyst concentration to complete the reaction, as illustrated in U.S. Pat. No. 4,612,156.

In addition it is observed that, depending on the intended use of the advanced resin, in some cases the upgrading process is preferably carried out in the absence of a solvent in order to avoid solvent stripping and vacuum devolatilization since even then the final product contains significant amounts of undesirable solvents. These residual solvents may cause numerous problems when the product is fabricated into a usable product, such as films, by coextrusion or moulding. The residual solvents require extensive vacuum drying to prevent voids in the film and moulded articles. The hazard of solvents being released from a product during fabrication could cause a problem unless proper venting is employed. Solvents may have an adverse effect on polymer properties such as stability, colour, haze etc.

It will be appreciated that depending on the relative amounts of epoxy compound and the compound having at least one hydroxyl compound or carboxyl compound, the end product is epoxy compound or a hydroxyl or carboxyl compound. The above described problems, however, hold for all end products.

SUMMARY OF THE INVENTION

The process of the present invention solves the above described problems. Short reaction times are sufficient (reaction times are usually in the order of up to 1 hour at most), relatively low capital requirements are necessary and a constant product consistency is obtained. Operational costs are low when compared with the known processes. These advantages are obtained by mixing the reactants, transferring the mixture to a moving surface at a suitable temperature to form a reacting layer and allowing the components to react on the moving surface. Optionally further heating and/or cooling may be applied to the reaction mixture on the moving surface to create the desired temperature profile. It will be appreciated that an ideal plug flow is obtained in this way, resulting in the high product quality.

Thus, the present invention relates to a process for the preparation of an advanced resin by reaction of a compound having on average more than one epoxy group per molecule and a compound having on average at least one hydroxyl group or carboxyl group per molecule, in the presence of a catalyst at elevated temperature, the process comprising (1) mixing the epoxy compound with the compound having at least one hydroxyl compound or carboxyl compound and the catalyst, and (2) transferring the mixture as a feedstream to a surface which is at least intermittently moving with respect to the feedstream.

DETAILED DESCRIPTION OF THE INVENTION

It will be clear that the above described process has numerous advantages over the prior art processes. The process is a continuous process using short reaction times only. The necessary equipment is relatively cheap. No back mixing is possible. No continuous fouling of the equipment occurs. High quality advanced resin can be made of equally consistent quality.

It will be appreciated that reaction between components to be transferred on moving surface may alternatively have partially taken place. However, according to preferred embodiments, substantial reaction between the components before transferring to the moving surface, is avoided.

In the above process the mixing of the epoxy compound and the hydroxyl compound (preferably phenolic compound) or carboxyl compound is preferably carried out as a continuous process. The two components are preferably mixed as liquid components. Mixing may be carried out by methods well known in the art, e.g. in one or more simple mixing chambers, but is preferably carried out in a device which mixes the ingredients intensively in a short time, e.g. a conventional mixer, an impingement mixer, an extruder, a high shear mixer or a static mixer. It will be appreciated that the mixing of reactants and catalyst may be performed in more than one mixing stages using more than one mixer, which may be the same or different. It is possible to mix the three components at the same time, but it is also possible to use a mixture of one of the reactants and the catalyst, followed by mixing with the second component. Another possibility is to mix the two reactants, followed by addition of the catalyst. Mixing may be carried out at another location provided that reactions only occur to a minor degree (less than 50% of the original epoxy groups have reacted), followed by transport to the location where the reaction is carried out. Mixing is suitably carried out at a temperature from about 60° C. to about 240° C., preferably from about 80° C. to about 220° C., more preferably from about 100° C. to about 190° C. at least partly by using preheated reactants. Heating may be applied during mixing (including heat generated by the mixing process) or thereafter. In the case that one of the components is a solid, the temperature of the two components may be chosen such that a solution is obtained having a temperature as mentioned above. For instance, solid hydroxy reactant of ambient temperature may be mixed with liquid epoxy compound of e.g. 150° C. In the case that the two components are mixed at the minimum reaction temperature or above this temperature, it will be clear that mixing and deposition should be carried out fast to prevent any premature reaction as much as possible.

After mixing, the reaction mixture is transferred to the moving surface, preferably in a continuous way. The mixture may be simply poured onto the surface or may for instance be sprayed or dropped onto the surface. A convenient way is a simple pipe or a number of pipes, which pipe or pipes may be fixed or moving. Another possibility is a single or multiple nozzle system, which may distribute the feedstream as a flow or as a spray. In general these techniques are known in the art. The thickness of the layer is suitably from about 1 mm to about 10 mm, preferably from about 2 mm to about 5 mm, especially from about 3 mm to about 4 mm.

In the process, it is possible that the surface is a fixed surface, while the feedstream is moved above the surface. This is possible in batch or semi continuous processes, as after deposition of the reaction mixture and completion of the reaction, the reaction mixture has to be removed from the surface. Preferably, the feedstream has a fixed position and the surface is a moving surface. This makes it possible to carry out the reaction in a continuous way. It is of course possible that the feedstream as well as the surface are moving.

The moving surface is preferably a continuously moving surface, although an intermittently moving surface is also possible. More preferably, the surface is continuously moving at the same speed. The surface itself may have every possible shape, for instance it might be a drum or a plate, but preferably the surface is a flat surface e.g. a plate, a moving belt (the top layer being the moving surface), a disk or a flat ring. Preferably the surface is a continuous belt or endless conveyer belt, as described in e.g. U.S. Pat. No. 4,389,357. Preferably a continuous stainless steel belt is used. The dimensions of the belt are not relevant for the principle of the invention. The width of the belt may be from a few centimeters to several meters, depending on the desired capacity. The length of the belt may be between several meters up to several hundreds of meters, depending on speed of the belt, reaction time and desired capacity. Usually a belt width of from about 0.2 meters to about 5 meters, especially from about 0.4 m to about 3 m, and a belt length of from about 10 meters to about 100 meters, especially from about 40 m to about 80 m, will be suitable. The moving surface is in at least one direction preferably horizontal or substantially horizontal, i.e. less then 3 degrees deviating from the horizon, preferably less than 1 degree. In the case of an endless conveyer belt this holds also for the other direction.

After depositing the reaction mixture on the surface there is no need for physical agitation of the mixture, e.g. stirring or mixing. Thus, no back mixing occurs, resulting in a product quality of extreme high uniformity. If desired ultrasonic, sonic or subsonic radiation may be used to improve the homogeneity.

The reaction mixture usually will have a temperature from about 60° C. to about 240° C., preferably from about 80° C. to about 220° C., more preferably from about 100° C. to about 190° C. To control the reaction rate additional heating means may be installed to increase the temperature of the reaction mixture. In this respect it is observed that the reaction is exothermic, and provided that the temperature is sufficiently high, the temperature of the mixture will increase. In the case that the temperature of the reaction mixture is too low to start the reaction, additional heating means are necessary. In the particular case of bisphenol A and the diglycidyl ether of bisphenol A, the starting temperature sufficiently high to reach the exothermic phase is from about 110° C. to about 125° C., usually about 120° C. After a first set of additional heating means, a second set of additional heating means may be used, especially to keep the reaction temperature sufficiently high to finish the reaction in a relatively short time. Suitably, the temperature of the deposited layer is heated in such a way that the temperature is from about 120° C. to about 220° C., preferably from about 140° C. to about 200° C. It will be understood that the temperature increase of the deposited layer will be the combined effect of the heating and cooling means and the exothermic reaction. Depending on the thickness of the layer and the own cooling capacity of the moving surface, it might be necessary to install additional cooling means in order to prevent that the temperature reaches values at which decomposition of the product could occur. In general cooling means should be used in the case the reaction temperature exceeds about 240° C., especially about 220° C., more especially about 200° C. Near the end of the moving surface the reaction product is preferably cooled to a temperature suitably below about 100° C., especially below about 60° C., more especially below about 30° C. Thus, the solid reaction product which is usually obtained after cooling can easily be removed from the surface.

Suitable heating means are infra red radiators, a hot gas oven or heating means at the back side of the surface using heated steam, oil or electricity. Suitable cooling means are (inert) gasses or oil or water applied to the back side of the surface. Heating means and cooling means which can be used are known in the literature, for instance in J. H. Perry, the Chemical Engineer's Handbook.

The reaction between the epoxy compound and the hydroxyl compound or the carboxyl compound should preferably take place on the moving surface. Preferably less than 50% of the epoxy groups of the stating epoxy compound have reacted before the mix is deposited onto the moving surface, preferably less than 20, more preferably less than 5 percent, even more preferably less than 2 percent. Depending on the specific type of resins to be advanced a certain degree of pre-reaction may be allowable.

An easy way to prevent reaction before deposition onto the moving surface is to keep the temperature sufficiently low, e.g. below about 120° C. The temperature profile applied to the reaction mixture, and depending on the starting temperature of the mixture, the heating and cooling means and the reaction heat, should be such that at least 80 percent of the theoretical conversion has been achieved, preferably at least 95 percent, more preferably at least 98 percent, at the end of the reaction cycle.

When the reaction is complete or substantially complete, the reaction mixture is allowed to come off from the surface. In the case of an endless belt this may happen automatically. Otherwise mechanical means may be used to remove the reaction product. A suitable way to reach the end temperature is by cooling the moving surface at the underside with water, but other cooling means can also be used.

The epoxy resins used as starting material in the present invention generally have on average more than one, suitably at least 1.5, preferably at least 1.7, reactive 1,2-epoxy groups per molecule. These epoxy compounds generally have on average up to 6, preferably up to 5, more preferably up to 2.5, reactive 1,2-epoxy groups per molecule. These epoxy compounds can be monomeric or polymeric, saturated or unsaturated, aliphatic, cycloaliphatic, aromatic or heteroaromatic and may be substituted, if desired, with other substituents in addition to the epoxy groups, e.g. hydroxyl groups, alkoxyl groups or halogen atoms, especially bromine atoms. It will be appreciated that also mixtures of epoxy compounds can be used.

Suitable epoxy compounds are the reaction products of polyphenols and epihalohydrins, polyalcohols and epihalohydrins, amines and epihalohydrins, sulphur containing compounds and epihalohydrins, polycarboxylic acids and epihalohydrins or mixtures thereof.

Preferred epoxy compounds are the reaction products of polyphenols and epihalohydrins, of polyalcohols and epihalohydrins, polycarboxylic acids and epihalohydrins or mixtures thereof, the reaction products of polyphenols and epihalohydrins especially preferred. Illustrative examples of epoxy compounds are described in for instance *The Handbook of Epoxy Resins* by H. Lee and K. Neville, McGraw-Hill, New York (1967), *Epoxy Resins, Chemistry and Technology*, edited by C. A. May, Marcel Dekker (1988) and *Chemistry and Technology of Epoxy Resins*, edited by B. Ellis, Blackie Academic & Professional (1993).

Epoxy compounds of particular interest in the practice of the present invention include diglycidyl ethers of bisphenol compounds, particularly those compounds represented by general formula (I):

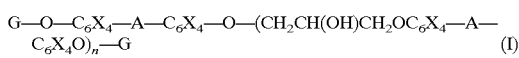

$$G-O-C_6X_4-A-C_6X_4-O-(CH_2CH(OH)CH_2OC_6X_4-A-C_6X_4O)_n-G \quad (I)$$

in which G represents a glycidyl group, and wherein each A independently is a divalent hydrocarbon group having 1 to 8 carbon atoms, preferably methylene or isopropyli-dene, —C(O)—, —O—, —S—, —S—S—, —S(O)—, —S(O)$_2$— or a covalent bond, each X independently is hydrogen, an alkyl group having 1 to 4 carbon atoms, preferably methyl, or halogen, preferably chlorine or bromine, and n has an average value of from 1 to 12. preferably A is isopropylene, X is hydrogen or bromine, especially hydrogen, and n is up to 0.2.

The average epoxy equivalent weight (EEW, weight of resin in grams containing one mol equivalent epoxy) is suitably from 140, preferably from 160, up to about 3000, preferably up to 950, more preferably up to about 450, still more preferably about 185.

Especially preferred examples of the epoxy compounds are bisphenol A and bisphenol F, especially bisphenol A, type epoxy compounds having an average epoxy equivalent weight of from 160 to 200. They are commercially available from Shell Chemicals Europe and Shell Chemical Corporation (USA) under the trade names EPIKOTE® and EPON®. Further especially preferred examples are brominated bisphenol A compounds which for example have an epoxy equivalent of from 200 to 800.

Further useful epoxy compounds are epoxy novolac resins. The epoxy novolac resins can be obtained by reacting, preferably in the presence of a basic catalyst, e.g. sodium or potassium hydroxide, an epihalohydrin, e.g. epichlorohydrin, with the resinous condensate of an aldehyde, e.g. formaldehyde, and either a monohydric phenol, e.g. phenol itself, or a polyhydric phenol. Further details concerning the nature and preparation of these epoxy novolacs resins can be obtained in *Handbook of Epoxy Resins* and the other references mentioned above.

The above-mentioned epoxy compounds can be obtained by means known for the preparation of epoxy resins from a compound containing hydroxyl groups by reacting such compounds with an epihalohydrin in the presence of a suitable catalyst and reacting the resultant intermediate halohydrin ether with a basic acting substance such as an alkali metal hydroxide. It is observed that many of the epoxy compounds to be used for the production of the modified resins of this invention are commercially available.

The preferably used aromatic hydroxyl group containing starting compounds in the present invention have on average more than one, suitably at least 1.5, preferably at least 1.7, reactive hydroxyl groups per molecule. Preferably the number of aromatic hydroxyl groups is between 1.8 and 2.3, more preferably between 1.9 and 2.1. These aromatic hydroxyl compounds may be monomeric or polymeric and may be substituted, if desired, with other substituents in addition to the hydroxy groups, e.g. alkoxyl groups or halogen atoms, especially bromine atoms. It will be appreciated that also mixtures of hydroxy compounds can be used. Further, it is also possible to use mono-aromatic hydroxyl compounds, resulting in (partial) end-capping of the epoxy compound.

Illustrative examples of aromatic hydroxy compounds are described in for instance *The Handbook of Epoxy Resins* by H. Lee and K. Neville, McGraw-Hill, New York (1967), Epoxy Resins, Chemistry and Technology, edited by C. A. May, Marcel Dekker (1988) and *Chemistry and Technology of Epoxy Resins,* edited by B. Ellis, Blackie Academic & Professional (1993).

Aromatic hydroxy compounds of particular interest for the present invention include bisphenol compounds, particularly those compounds represented by general formula (II),

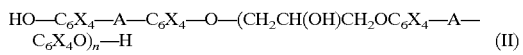
$$HO-C_6X_4-A-C_6X_4-O-(CH_2CH(OH)CH_2OC_6X_4-A-C_6X_4O)_n-H \qquad (II)$$

wherein each A independently is a divalent hydrocarbon group having 1 to 8 carbon atoms, preferably methylene or isopropylidene, —C(O)—, —O—, —S—, —S—S—, —S(O)—, —S(0)$_2$— or a covalent bond, each X independently is hydrogen, an alkyl group having 1 to 4 carbon atoms, preferably methyl, or halogen, preferably chlorine or bromine, and n has an average value of 0 to 12, preferably 0 to 2. More preferably A is isopropylene, X is hydrogen or bromine, especially hydrogen, and n is up to 0.2. Aromatic hydroxy compounds which are very suitable for the process of the present invention are commercially available, for instance under the general names bisphenol A and bisphenol F.

The average hydroxy equivalent weight is from 140, preferably from 170, up to about 3000, preferably up to 950, more preferably up to about 450. Especially preferred examples are bisphenol A and bisphenol F, especially bisphenol A, having an average hydroxy equivalent weight of 160 to 200.

Illustrative examples of suitable carboxyl compounds are described in, for instance, *The Handbook of Epoxy Resins b Epoxy Resins, Chemistry and Technology.* edited by C. A. May, Marcel Dekker (1988) and *Chemistry and Technology of Epoxy Resins,* edited by B. Ellis, Blackie Academic & Professional (1993).

Carboxyl compounds of particular interest for the present invention are aromatic and aliphatic carboxylic acids. Very suitable are aromatic di- and tri-carboxylic acids and aliphatic dicarboxylic acids. Especially suitable are phthalic acid, terephthalic acid or an alpha, omega dicarboxylic aliphatic acid in which the aliphatic group is a linear alkyl group containing 1 to 12 carbon atoms.

It will be appreciated that optionally mono-epoxy compounds, mono-aromatic hydroxyl compounds and/or mono-carboxylic compounds may be added to the reaction mixture in order to control the amount of reactive end groups in addition to one or more polyfunctional compounds. For instance, the amount of epoxy groups in an advanced epoxy resin may be controlled by the addition of a certain amount of phenol or cresol or benzoic acid. Examples of mono-epoxy compounds are glycidyl esters of carboxylic acids, especially tertiary carboxylic acids as VERSATIC® acids, and optionally substituted benzoic acids. Examples of mono-phenol compounds are p-tert.-butyl phenol and nonyl phenol. Examples of mono-carboxylic compounds are optionally substituted benzoic acids and tertiary carboxylic acids as versatic acids.

Suitable catalysts which can be employed in the reaction of the present invention include quaternary ammonium compounds, quaternary phosphonium compounds, sulphonium compounds and mixtures thereof. Suitable quaternary ammonium compounds include tetramethyl ammonium chloride, benzyl trimethyl ammonium chloride, triethanol ammonium chloride, tetraethanol ammonium hydroxide and dodecyl dimethylbenzyl ammonium naphthenate. Suitable quaternary phosphonium catalysts include for example ethyl triphenyl phosphonium chloride, bromide or iodide, or acetic acid complex, benzyltriphenyl phosphonium-chloride or -bromide or iodide, tetrabutyl phosphonium-chloride, -bromide or -iodide and mixtures thereof. Suitable sulphonium catalysts include thio urea catalysts as tetramethyl thiourea, N,N'-dimethyl thiourea, N,N'-diphenyl thiourea and mixtures as well as thioethanol and other sulfonium precursors. For further details reference is made to the catalysts mentioned in the above mentioned handbooks and in U.S. Pat. No. 5,310,854, EP 467,278, U.S. Pat. Nos. 5,360,886, 3,919,169, 3,341,580, 3,477,990 and the references cited in these documents, each incorporated herein by reference. A suitable group of catalysts are also peralkylated amino imino diaza phosphorin compounds such as 2-t-butylimino-2-diethylamino-1,3-dimethyl perhydro-1,3,2-diazaphosphorin. See e.g. U.S. Pat. No. 5,063,252 incorporated herein by reference. The catalyst is employed in any amount which is satisfactory to catalyze the reaction between the epoxy compound and the hydroxyl compound. Suitable amounts are from about 0.01 to about 3 weight percent, more suitable from about 0.01 to about 1 weight percent. More preferred amounts are between 0.01 and 0.2 weight percent of catalysts based on the combined weight of the reactants. The catalyst is preferably used in the form of a concentrated solution, for example in an alcohol. It will be appreciated that also mixtures of catalysts can be used.

A preferred group of catalysts is formed by quaternary phosphonium compound and quaternary ammonium compounds. A more preferred group is formed by the quaternary phosphonium compounds and most preferably ethyltriphenyl phosphonium halide.

After the solid epoxy resin has been prepared by the process of the present invention, it is then processed in the conventional manner for ultimate use, i.e. it is crushed, sieved, classified and/or diluted with suitable solvents and reactants to prepare solution resins useful as coatings and the like. The epoxy resin products suitably have an EEW of between 300 and 50,000, preferably from 400 to 10,000 and a weight average molecular weight from about 600 to about 100,000, preferably from about 800 to about 20,000.

The process of the present invention is suitably carried out at a molar ratio of the epoxy groups of the epoxy compound and the hydroxyl groups of the hydroxyl compound between 5.0/1.0 and 1.0/5.0, preferably between 2.5/1.0 and 1.0/1.0, more preferably between 2.2/1.0 and 1.1/1.0.

The invention is further illustrated by the following examples which are included for illustrative purposes only and are in no way meant to limit the present invention.

EXAMPLES

The reactive ingredients e.g. bisphenol A (diphenylolpropane, DPP), the diglycidylether of bisphenol A (commercially available from Shell Chemicals Europe under the name EPIKOTE®-828) and the catalyst are mixed at or slightly below the reaction temperature using a high speed stirrer in a reaction vessel.

Example 1

A model experiment was set up to demonstrate the inventive concept of the present invention. A homogeneous feed was prepared by dissolving 18 g of bisphenol A in 45 g of liquid diglycidyl ether of bisphenol A (EEW 182, EPIKOTE® 828) at 135° C. The epoxy group content (EGC) of the mixture was 3817 mmol/kg, which theoretically should result in a reaction product having an EGC of 1350 mmol/kg. After cooling till 70° C. the catalyst (1 mmol/kg ethyl triphenyl phosphonium iodide, ETPPI) was added as an aqueous ethanolic solution (30 wt %). The mixture was divided over various thin-walled aluminium trays (approx. 6.5 g per tray, diameter=5 cm, layer thickness–2.5 mm). Two series of experiments were carried out:

a: isothermal; the content of the tray was kept at 180° C. by means of infrared heating above the tray.

b: exothermal; the bottom of the tray was heated in such a way that an inert material would become 180° C. in 4 min. and kept at that temperature thereafter (in the reactive mixture higher temperatures were measured in view of the exothermal reaction).

After a certain period the trays were cooled till –78° C. (and analyzed at room temperature). Arbitrarily the time that the reactive mixture was above 150° C. was taken as the reaction time. Analysis showed that the target EGC value was reached within 30 minutes irrespective of the type of reaction conditions. The phenolic-OH content of the 30 min. product was 17 mmol/kg (for all reaction mixtures).

Example 2

In a series of similar experiments an alternative catalyst, 2-tert-butylimino-2-diethylamino-1,3-dimethylperhydro-1,3,2-diaza-phosphorine, was used. The target EGC values were also reached within 30 min., again irrespective of the applied reaction conditions.

Example 3

A mixture of bisphenol A and the diglycidyl ether of bisphenol A (EEW 182, EPIKOTE® 828) with an EGC value of 3825 mmol/kg prepared in the same way as described in example 1 and containing 1 mmol/kg of ETPPI was, as a 3 mm layer, placed in an oven at 170° C. with surround air heating. After 30 min. the target EGC value of 1350 mmol/kg was found.

Example 4

A mixture of bisphenol A and the diglycidyl ether of bisphenol A (EEW 182, EPIKOTE® 828) with an EGC value of 3548 mmol/kg prepared in the same way as in example 1 and containing 3 mmol/kg of ETPPI was, as a 3 mm layer, placed in an oven at 170° C. with surround air heating. After 30 min. the target EGC value of 600 mmol/kg was found. The product had a phenolic-OH content of 11 mmol/kg.

Examples 5–7

Bisphenol A, liquid diglycidyl ether of bisphenol F (EPIKOTE® 862 and ETPPI were mixed in the mutual weight ratios of Example 1 in a 5 kg batch in a prereactor. The final temperature of the mixture after stirring during at most 10 minutes was 80° C.

The mixture was poured on a flat moving endless belt which had a width of 15 cm, a length of 5 m and upper edges on which had been mounted, while the layer thickness was 1, 2 and 5 mm respectively. Over a length of three meters of the endless belt an electrical heating was applied, while a roof had been mounted over that belt area.

The belt moved continuously with a speed of about 6 m/hr., whereas the temperature of the belt surface was 180° C.

The mixture was cooled after leaving the roof for about 20 minutes. The solid resin mass could be broken off from the end of the belt after 50 minutes.

The obtained resins showed a phenolic value of less than 50 mmol/kg.

Example 8

A 5 kg batch of a mixture of the same ingredients in the same mutual weight ratios as in Example 1 was stirred during about 45 minutes at 90° C., during which about ⅓ of the original amount of available epoxy groups had been reacted.

The prereacted mass was poured on the same moving endless belt of Examples 5–7, except that a layer of a thickness of 1 cm was formed. The speed of the endless belt was about 6 m/hr.

The mixture was cooled after leaving the roof for about 20 minutes. The solid resin mass could be broken off from the end of the belt after 50 minutes. The obtained resin showed a phenolic OH value of 18 mmol/kg.

Example 9

A homogeneous feed was prepared by dissolving 290.5 g of bisphenol-A in 509.5 g of liquid-ether of bisphenol-A (EEW 182, EPIKOTE® 828) at 120° C. The EGC of the mixture is 3389 mmol/kg, which theoretically should result in a reaction product having a EGC of 204 mmol/kg. After cooling to 90° C. 5 mmol/kg ETPPI (see Example 1) was added. The mixture was poured on a flat moving belt like in Examples 5–7, while the layer was 1 and 3 mm. After 1 hour at 180 ° C. the EGC was 248 mmol/kg and the phenolic value of less then 100 mmol/kg.

Examples 10–15

The proceedings of Example 9 were repeated under the same conditions except that instead of ethyltriphenyl phosphonium iodide (ETPPI) the corresponding ethyl triphenyl phosphonium-chloride, -bromide, tetra-n-butylphosphonium-chloride, -bromide and -iodide and tetramethylammonium chloride were used, providing advanced resins having an EGC in the range of from 230–270 mmol/kg and a phenolic value of less than 100 mmol/kg.

Examples 16–20

The proceedings of Example 5 were repeated under the same conditions except that instead of ethyltriphenyl-phosphonium iodide (ETPPI), the corresponding ethyl triphenyl phosphonium-chloride and -bromide, tetra-n-butyl phosphonium-chloride, -bromide and -iodide, and tetramethylammoniumchloride were used. Advanced resins were obtained and were used having an EGC in the range of from 1500 to 1900 mmol/kg and a phenolic value of less than 50 mmol/kg.

Example 21

A homogenous feed was prepared by dissolving 16 g of PRIPOL® 1022 (mixture of di- and tri-carboxylic fatty acid) in 34 g of liquid diglycidyl ether of bisphenol A (EEW 182, EPIKOTE® 828) at 70° C., the EGC of the mixture was 3621 mmol/kg, which theoretically should result in a EGC of 2517 mmol/kg, the catalyst tri-ethanolammonium borate was added and the mixture was divided over various thin-walled aluminum trays. The trays were placed on the belt at a temperature of 160° C. Two experiments were carried out, of a 1 mm and 2 mm layer. After respectively 2 hours a EGC of 2528 mmol/kg was found.

Example 22

The proceedings of Example 21 were repeated except that the mixture contained 17.39 g of E828 and 12.64 g of PRIPOL® 1022 respectively, and had a theoretical EGC of 1632 mmol/kg. After two hours the EGC was 1705 mmol/kg.

Example 23

The proceedings of Example 9 were repeated except that the epoxy resin EPIKOTE® 828 was replaced by an amount of EPIKOTE® 834 resin of 682.5 g, resulting after about one hour at 180° C. in an EGC of 240 mmol/kg and a phenolic value of less than 100 mmol/kg.

Example 24

The proceedings of Example 9 were repeated except that the epoxy resin EPIKOTE® 828 was replaced by an amount of EPIKOTE® 1001 resin of 1363.5 g, resulting after about one hour at 180° C. in EGC of 240 mmol/kg and a phenolic value of less than 100 mmol/kg.

What is claimed is:

1. A cured composition obtained by using an advanced epoxy resin prepared by reaction of a compound having on average more than one epoxy group per molecule and a compound having on average at least one hydroxyl group or carboxyl group per molecule in the presence of a catalyst at elevated temperature, the process comprising:
   (a) mixing the epoxy compound, the hydroxyl compound or the carboxyl compound and the catalyst; and
   (b) transferring the mixture as a feedstream to a surface exposed to an elevated temperature sufficient to produce an advanced epoxy resin which is at least intermittently moving with respect to the feedstream.

2. The coating composition of claim 1 wherein the mixing process and the transferring process are continuous processes.

3. The coating composition of claim 2 wherein the moving surface is continuously moving at the same speed.

4. The coating composition of claim 1 wherein the surface is a continuous belt.

5. The coating composition of claim 4 wherein no physical agitation is applied to the deposited layer.

6. The coating composition of claim 1 wherein an aromatic hydroxyl group containing compound is used.

7. The coating composition of claim 1 wherein the epoxy compound has the general formula I

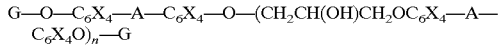

wherein G represents a glycidyl group, and A is methylene or isopropylene, each X is independently hydrogen or bromine, and n has an average value of 0 to 12.

8. The coating composition of claim 6 wherein the aromatic hydroxyl compound has the general formula II

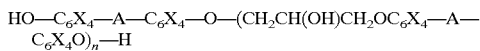

wherein A is methylene or isopropylene, each X is independently hydrogen or bromine and n has an average value of 1 to 12.

9. The coating composition of claim 1 wherein the catalyst is a quaternary ammonium or phosphonium compound.

* * * * *